Dec. 13, 1966  P. H. HARRIS ETAL  3,291,205
APPARATUS FOR ALKALI METAL CONDENSATION IN CEMENT KILNS
Filed May 21, 1964  2 Sheets-Sheet 1

INVENTORS
PHILIP H. HARRIS
DAVID A. JOHNSON
BY
Christie, Parker & Hale
ATTORNEYS.

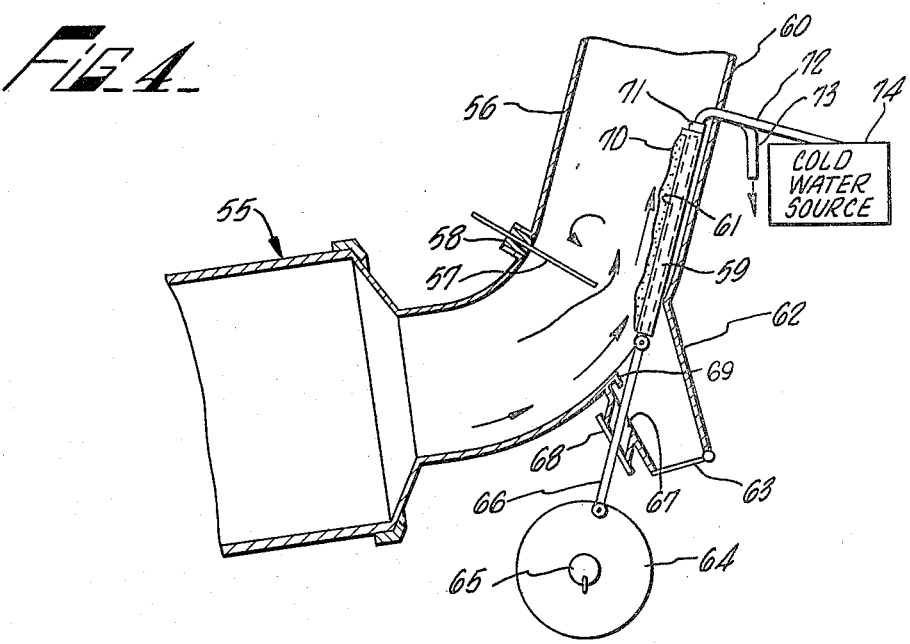
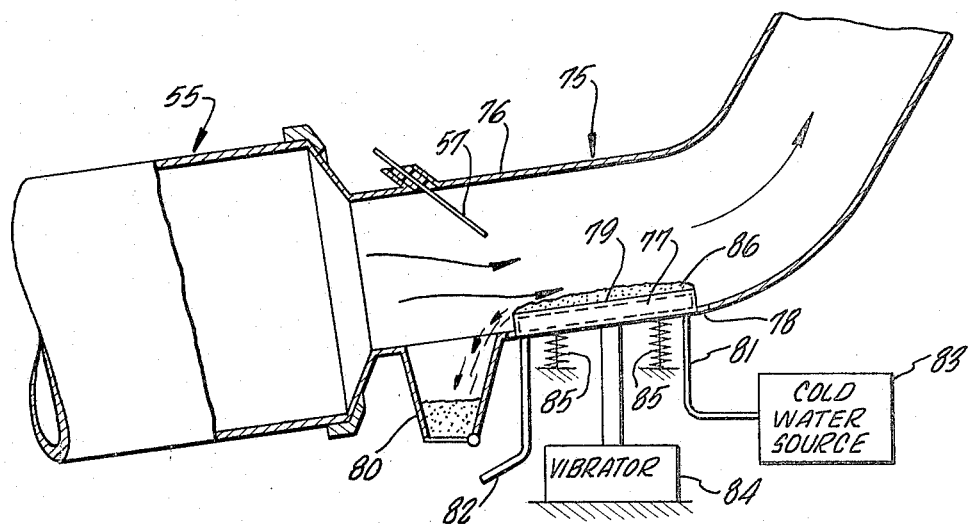

United States Patent Office 3,291,205
Patented Dec. 13, 1966

3,291,205
APPARATUS FOR ALKALI METAL CONDENSATION IN CEMENT KILNS
Philip H. Harris, Upland, and David A. Johnson, San Bernardino, Calif., assignors to American Cement Corporation, Los Angeles, Calif., a corporation of Delaware
Filed May 21, 1964, Ser. No. 369,226
1 Claim. (Cl. 165—94)

This invention relates to apparatus for condensing volatilized alkali metals and, more particularly, to such apparatus for use in exhaust ducts of cement kilns.

As is well known, most cement raw materials contain alkali metal compounds in some amount. As these raw materials enter the clinkering zone of a cement kiln, a portion of the alkalis are volatilized and are carried by the exhaust gases toward the exit duct of the kiln. Depending upon the temperature of the gases leaving the kiln, a portion of the volatilized alkalis is carried out of the kiln by the exhaust gases.

It is desirable to remove volatilized alkalis from the exhaust gases shortly after the gases leave the kiln. For example, to improve the thermodynamic efficiency of the cement manufacturing process, hot exhaust gases leaving the kiln may be passed through a preheater in which cement raw materials are warmed prior to being introduced into the kiln. The alkaline vapors may condense in the preheater and be mixed with the raw material, thereby raising the alkali content of the raw material. Additionally, if the fine dust formed by condensation of these vapors is passed into the atmosphere, undesirable pollution of the atmosphere occurs. These problems can be overcome by condensation of the alkali vapors and their removal from the exhaust gas stream immediately downstream of the exit from the kiln.

This invention provides an effective, inexpensive, and efficient apparatus for condensing alkali vapors in the gas stream leaving a cement kiln. The apparatus may be added to cement processing plants without extensive reconstruction of the existing structure.

Generally speaking, this invention provides apparatus for condensing alkali vapors in the exhaust gases which pass from a cement kiln into and through a duct. The apparatus includes at least one vapor-condensing surface disposed in the duct proximate to the kiln and means which cooperate with the surface for directing gas flowing through the duct over the surface. Means are provided for cooling the surface so that the alkali vapors in the gas are condensed on the surface. The means which cooperate with the surface to direct gas over the surface may be either a baffle disposed adjacent the surface or the configuration of the duct itself adjacent the surface and/or between the surface and the kiln. In one embodiment of the invention, the apparatus includes means for removing the condensed alkali product from the condensing surface. Preferably, the surface is defined by a hollow member through which water is circuated for cooling the surface.

The above-mentioned and other features of the invention are more fully set forth in the following detailed description of the invention taken in conjunction with the accompanying drawings, wherein:

FIG. 4 is a cross-sectional elevation view of still another condensing apparatus according to this invention; and FIG. 5 is a cross-sectional elevation view of yet another condensing apparatus according to this invention.

Figure 1:
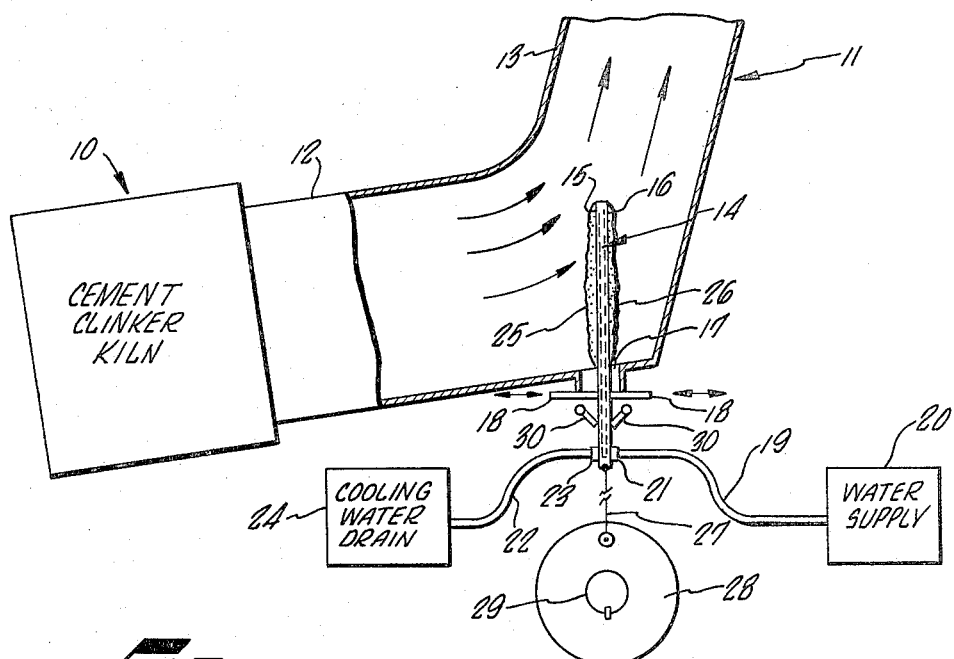
FIG. 1 is a cross-sectional elevttion view of condensing apparatus according to this invention.

A cement clinker kiln 10 of conventional construction is schematically represented in FIG. 1. An exhaust duct 11 is connected to the exhaust end of the kiln and has a first portion 12 which extends substantially horizontally from the kiln and a second portion 13 which extends upwardly to the stack (not shown) through which gases leaving the kiln are vented either to the atmosphere or passed to a preheater for cement raw materials. A hollow metal condenser and condensate collector plate 14 is disposed in the duct and extends partially transversely of duct portion 12 in the vicinity of the bend between the horizontal and vertical portions of the duct. The plate defines substantially parallel flat surfaces 15, 16 facing toward and away from the kiln, respectively. The plate is positioned in the bend of the duct so that gases flowing through the duct are caused to pass over surface 15 and to swirl or eddy about surface 16.

The collector plate extends through an opening 17 in the lower extremity of duct portion 12 adjacent the bend. A pair of slidable doors 18 cooperate with opening 17 and the plate to close the opening when the collector plate is disposed at least partially inside the duct as shown in FIG. 1. The doors are slidable toward and away from the collector plate by a conventional mechanism (not shown). A flexible water inlet hose 19 is connected between a water supply 20 and a fitting 21 coupled to the portion of the collector plate extending outside of the duct. A flexible water outlet hose 22 is connected between a fitting 23 similar to fitting 22 and a drain 24.

The collector plate is fitted with an internal baffle (not shown) so that water introduced into the interior of the plate through hose 19 flows upwardly along one side of the plate and then downwardly along the other side of the plate to hose 22. The plate is cooled by water circulated through it to such a degree that condensible alkali compounds present in the exhaust gas leaving kiln 10 are condensed on condensing surfaces 15, 16 as the exhaust gases sweep past the plate. As shown in FIG. 1, the condensed alkalis form deposits 25, 26 on the upstream and downstream faces of the collector plate. When the deposits have built up to an extent that interferes with heat transfer and therefore condensation of the alkali vapors, the plate is retracted from the duct and the deposits are removed from the plate. The plate is then reinserted into the duct and the condensation process continues.

In order that the condenser and condensate collector plate may be conveniently retracted from the duct, the lower end of the plate is connected to a selectively operable plate retraction mechanism. As shown in FIG. 1, the lower end of the plate is pivotally connected to a link 27 which in turn is pivotally connected to a crank wheel 28. The crank wheel is keyed to a rotatable shaft 29. One full rotation of the shaft causes the plate to move through one cycle of retraction from and reinsertion into the duct. The operation of the mechanism for actuating doors 18 is synchronized with the rotation of shaft 29. As shaft 29 rotates from the position shown in FIG. 1 in which the condenser plate is disposed in operative position in the duct, the doors move apart. The plate with the deposits accumulated thereon moves downwardly through opening 17. A pair of deposit scraper elements 30 are fixed adjacent the plate in close proximity to surfaces 15, 16. As the plate moves downwardly, the scraper elements engage the deposits and flake, chip, or otherwise dislodge the deposits from the plate so that they fall into a collection bin (not shown). Continued rotation of shaft 29 through one full rotation returns the plate to its operative position in duct 11.

Figure 2:
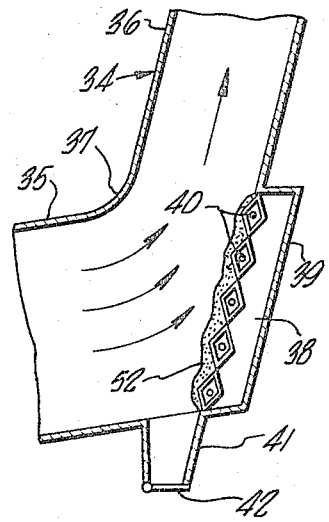
FIG. 2 is a cross-sectional elevation view of another embodiment of condensing apparatus according to this invention.

FIG. 2 illustrates another embodiment of alkali vapor condensing apparatus according to this invention. An exhaust duct 34 from a kiln (not shown) has a substantially horizontal portion 35 and a substantially vertical portion 36 connected together by a bend or transition section 37. A recess 38 is formed in a wall 39 of the duct which faces duct portion 35. A plurality of hollow vapor condenser and condensate collector members 40 are disposed across the opening of the recess, and close the recess to the duct when they are in their operative positions as shown. A deposit collecting trap 41 is formed in the duct immediately upstream of the lower end of recess 38. Preferably, trap 41 has a hinged door 42 in its lower end. Collector members 40 are identical to each other and are of diamond-shaped cross-sectional configuration. When the collector members are in their operative poistions, the major diagonals of the members are aligned with one another, adjacent points of the diamond being substantially engaged with one another.

Figure 3:
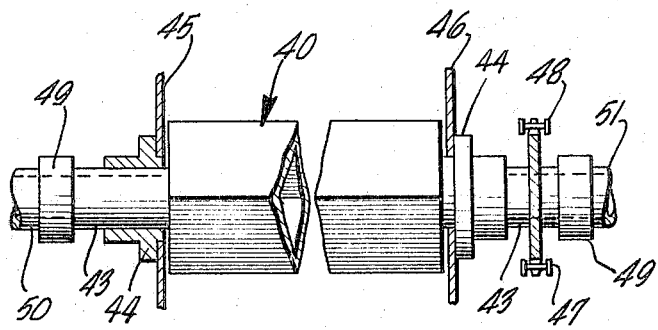
FIG. 3 is a fragmentary elevation view of one of the diamond-shaped elements shown in FIG. 3.

As shown in FIG. 3, each collector member 40 is hollow and has a hollow axle 43 extending from each end thereof. The axles are rotatably journaled in bearing 44 which are carried in opposite walls 45, 46 of the recess. One axle has a chain sprocket wheel 47 secured thereto. A drive chain 48 is engaged with the sprocket wheels of each collector member. Each axle at its end remote from the collector member carries a slip fitting 49, each of which is coupled to a respective one of a pair of water inlet and outlet ducts 50, 51. Each collector member 40 therefore is adapted for the circulation of water through it.

As shown in FIG. 2, the collector members are arranged relative to bend 37 of duct 34 so that gases leaving the kiln sweep past the exposed surfaces of the collector members. Accordingly, alkali vapors condense upon the exposed cooled surfaces to form a deposit 52 of condensed material. When the deposit has accumulated to the desired degree, chain 48 is moved so that the collector members are rotated 180°. The movement of the collector members relative to one another causes the deposit to be broken from the collector members and to fall into trap 41.

FIG. 4 illustrates still another embodiment of apparatus according to this invention. A cement kiln 55 has an exhaust gas duct 56 which extends horizontally and then substantially vertically from the kiln. The bend in the duct is located proximate to the kiln. A gas deflecting baffle 57 is mounted in the bend of the duct and extends substantially radially of the bend. The baffle is slidably mounted in a pair of graphite mounting blocks 58, for example, so that the baffle is adjustable radially of the bend. A condenser and condensate collector plate 59 similar to collector plate 14 as described in connection with FIG. 1 is slidably mounted adjacent the baffle along a wall 60 of the substantially vertical portion of the duct. The plate has a condensing surface 61 exposed to the duct. The baffle assures that gas flowing through the duct sweeps and swirls over the condensing surface of the collector plate.

The lower end of the plate is disposed adjacent a trap 62 which has a hinged door 63 at its lower end. Means for operating the collector plate are provided and include a crank wheel 64 mounted upon a rotatable shaft 65. A connecting link 65 is pivotally connected to the crank wheel and extends through an opening 67 in the trap to a pivotal connection with the lower end of collector plate 59. A pair of slidable doors 68, operated in synchronism with shaft 65 by means not shown, close opening 67 relative to connecting link 66. A scraper element 69, which cooperates with the condensing surface of the collector plate, is formed at the downstream opening of the trap to scrape deposits 70 of alkali metal compounds from the collector plate as the collector plate is reciprocated past the scraper member upon rotation of shaft 64.

The upper end of collector plate 59 is engageable with a pair of fixed fittings 71 (only one of which is shown) which are connected to water inlet and outlet ducts 72, 73, respectively. Water inlet duct 72 is connected to a cold water source 74. Each of fittings 71 preferably cooperates with one of a pair of nipples (not shown) which are connected to the upper end of the collector plate. As each nipple engages its cooperating fitting, a valve in the fitting is operated so that water can flow through the fitting either to or from the plate as the case may be. As the plate is retracted upon rotation of shaft 64, however, withdrawal of the nipple from the fitting causes the fitting valve to close so that no water flows through the associated duct until the plate is returned to its operative position as shown in FIG. 4.

FIG. 5 shows still another embodiment of apparatus according to the present invention. A cement kiln 55 is connected to an exhaust duct 75 which has a substantially horizontal yet upwardly inclined portion 76 adjacent the kiln. An exhaust gas deflecting baffle 57 is adjustably mounted in the upper extent of the duct proximately adjacent the kiln. A hollow condenser and condensate collector plate 77 is disposed in an opening 78 in the lower wall of duct section 76 and is disposed so that it extends parallel to the gas flow. The plate presents a condensing surface 79 to the gases flowing through the duct. A trap 80 is formed in the lower wall of duct portion 76 between the kiln and the collector plate. One end of the collector plate has an inlet duct 81 connected to it and the other end has connected to it a water outlet duct 82. Duct 81 connects the collector plate with a cold water source 83 so that cold water circulates through the collector plate. The collector plate is mounted to a vibrator 84. The plate is also supported by springs 85 to a foundation exteriorly of the duct. If desired, the plate may be spring mounted to the duct. After a deposit 86 of alkali metal products accumulates on the condensing surface of collector plate 77, vibrator 84 is operated. The deposit is thereby shaken loose from the plate and the agitation of the plate causes the deposit and any fragments thereof to move down the incline into trap 80.

While the invention has been described above in conjunction with specific apparatus, this has been by way of example only, and is not to be considered as limiting the scope of this invention.

What is claimed is:

Apparatus for condensing condensible vapors of alkaline compounds from exhaust gases passing from a cement kiln through a duct comprising a plurality of hollow condenser and condensate collector members disposed in the duct, the exterior surfaces of the members collectively defining a condensing surface exposed to gases moving through the duct, each condenser and collector member having a diamond-shaped cross-sectional configuration transversely of a central axis thereof and being normally disposed so that at least one edge thereof is disposed in substantial registry with a similar edge of the next adjacent member so that the condensing surface is essentially continuous, means for mounting the condenser and collector members in adjacent parallel relation for rotation about the central axes thereof, means for circulating water through the members to cool the condensing surface so that vapors of alkaline compounds present in the exhaust gases flowing through the duct condense upon the condensing surface to form a deposit of condensate material, and means for synchronously rotating the members about the central axes thereof for fracturing and removing said deposit from the condensate surfaces.

References Cited by the Examiner

UNITED STATES PATENTS

| | | | |
|---|---|---|---|
| 2,183,496 | 12/1939 | Peters | 165—84 |
| 2,310,086 | 2/1943 | Howard | 165—86 |
| 3,022,046 | 2/1962 | Breig | 55—268 X |
| 3,048,375 | 8/1962 | Walker | 165—86 X |
| 3,049,235 | 8/1962 | Newburg | 209—346 |
| 3,198,247 | 8/1965 | Schlauch | 165—94 |

FOREIGN PATENTS 260,899 11/1926 Great Britain.

ROBERT F. BURNETT, *Primary Examiner.*